(12) United States Patent
Haze (10) Patent No.: US 6,644,245 B2
(45) Date of Patent: Nov. 11, 2003

(54) AUTOMATIC PET BLANKET

(76) Inventor: Robert Haze, 2505 E. Palmdale Blvd. #E, Palmdale, CA (US) 93550

( * ) Notice: Subject to any disclaimer, the term of this patent is extended or adjusted under 35 U.S.C. 154(b) by 0 days.

(21) Appl. No.: 10/274,902

(22) Filed: Oct. 20, 2002

(65) Prior Publication Data

US 2003/0037734 A1 Feb. 27, 2003

Related U.S. Application Data (63) Continuation of application No. 10/085,947, filed on Feb. 28, 2002, and a continuation of application No. 09/685,454, filed on Oct. 9, 2000, now abandoned.

(51) Int. Cl.[7] ............................................... A01K 13/00
(52) U.S. Cl. ..................... 119/850; 119/482; 119/484; 119/174
(58) Field of Search ................... 119/850, 482, 119/484, 174

(56) References Cited

U.S. PATENT DOCUMENTS

| | | | |
|---|---|---|---|
| 2,854,948 A | * 10/1958 | Drayson | ..................... 119/482 |
| 3,861,356 A | 1/1975 | Kulka | |
| 3,982,500 A | * 9/1976 | Marlatt | ..................... 119/482 |
| 4,202,676 A | 5/1980 | Pelosi et al. | |
| 4,207,643 A | 6/1980 | Beer et al. | |
| 4,671,049 A | 6/1987 | Benckhuijsen | |
| 4,683,839 A | * 8/1987 | Uhrick | ..................... 119/165 |
| 4,729,343 A | 3/1988 | Evans | |
| D308,121 S | * 5/1990 | Overturf | ..................... D30/118 |
| 5,000,116 A | 3/1991 | Fife | |
| 5,010,843 A | 4/1991 | Henry | |
| D324,117 S | * 2/1992 | Antoine | ..................... D30/144 |
| 5,474,026 A | * 12/1995 | Wohltjen | ..................... 119/28.5 |
| 5,517,946 A | * 5/1996 | Udelle et al. | ..................... 119/622 |
| 5,575,239 A | * 11/1996 | Bradburn et al. | ........... 119/500 |
| 5,662,065 A | 9/1997 | Bandimere et al. | |
| 5,794,420 A | 8/1998 | Fine | |
| 6,003,290 A | 12/1999 | Hsi-Chang | |
| 6,009,693 A | 1/2000 | Hsi-Chang | |
| 6,244,326 B1 | 6/2001 | Grieco | |
| 6,286,456 B1 | 9/2001 | Michaelis | |
| 6,421,857 B2 | 7/2002 | Whatman et al. | |
| 2002/0117120 A1 | * 8/2002 | Haze | ..................... 119/850 |

* cited by examiner

Primary Examiner—Charles T. Jordan
Assistant Examiner—Stephen A Holzen
(74) Attorney, Agent, or Firm—Roberta Fay (57) ABSTRACT

The invention is a new pet blanket that drapes around an animal in an outdoor kennel. The invention is installed in a pet kennel or animal enclosure. It comprises bundles of fabric that are attached to a platform or attached directly to the ceiling of a kennel. The attachment means comprises a Velcro® connection means or a mechanical safety snap connection means. The blanket fabric may be cotton, wool, a synthetic blend, or other suitable material, shaped into strands and gathered into bundles. The bundles of fabric hang down loosely from the ceiling or supporting platform, to within one to three inches from the floor of the kennel or animal stall. The bundles of fabric are spaced to allow the animal to move about freely in the kennel. At the same time, the bundles of fabric automatically provide a blanket that shelters the animal from the outside elements.

5 Claims, 6 Drawing Sheets fig.1

AUTOMATIC PET BLANKET

This is a continuation of application Ser. No. 10/085,947, filed Feb. 28, 2002. The prior application (Ser. No. 10/085, 947) is hereby incorporated by reference. Also, that application was a continuation of another prior application, Ser. No. 09/685,454, filed on Oct. 9, 2000 now abandoned. Therefore, that prior application (Ser. No. 09/685,454) is also hereby incorporated herein by reference.

FIELD OF THE INVENTION

The invention relates to protective coverings and/or blankets for domesticated animals that are kept in a kennel, stall, or alternative housing.

BACKGROUND

People have kept domesticated animals throughout recorded history. Among domesticated animals, dogs have been favored as companions, as work or guard dogs, or for a combination of purposes. Through familiarity, many dog owners come to regard their pets as part of the family, deserving of comfortable accommodations that other family members enjoy.

Dogs kept outdoors require an outdoor doghouse or kennel or similar enclosure for shelter from the elements and for resting and sleeping. In addition, a dog needs a blanket or cover during cold weather. Traditionally, pet covers are placed on top of an animal by the owner or caretaker. But when the animal moves about inside a doghouse or kennel, the cover is displaced. Ordinary blankets that lie on top of the animal are not stable enough for the animal to try to cover itself up by burrowing under the blanket. Moreover, animals with a disability (a gait abnormality or hip problem, for instance) may be further harmed by getting entangled in the blanket as they change positions.

The animal blankets and covers on the market offer few, if any, options for keeping the family dog warm and protected from harsh elements.

SUMMARY OF THE INVENTION

Dogs and many other animals love dens because of the protection and feeling of safety the dens give them. In the wild, animals dig and build dens; living with people, they typically sleep under a blanket. This invention resembles a den where the animal is protected on all sides. The animal is practically hugged by soft materials that keep it warm and safe. At the same time, the animal is unrestricted and can move about freely.

The Automatic Pet Blanket is a hanging animal cover. Bundles of fabric hang down loosely from a platform or from the ceiling of the dog's kennel to within one to three inches from the floor of the kennel or stall. Spacing of the bundles allows the animal to pass freely into or from a kennel or stall. The movable strips of fabric automatically cover the animal, providing warmth without heavy weight and providing protection from light, wind, cold air, blowing rain, and snow. This new blanket allows the animal to enter the kennel, to move about inside or go outside for water or food or to relieve itself. With an automatic hanging cover, the pet that moves about in the kennel does not become uncovered.

Ventilation is provided by the flow of air through the strands of fabric. Fewer bundles of fabric allow for greater ventilation and a cooler kennel. However, fewer bundles of fabric also provide less protection against light, wind, cold air, blowing rain, and snow.

For the Automatic Pet Blanket, bundled strips of fabric may be attached to a platform made of plastic, metal, or wood. The platform may be mounted on the ceiling or sidewalls of a kennel or individual animal shelter or stall. The platform may also be free-standing (with attached legs) within an existing animal shelter or stall. Alternatively, the bundles of fabric may be directly attached to the kennel ceiling.

The means for attaching the bundles to the platform or the ceiling may be a means for connecting Velcro® or a means for connecting a mechanical safety snap. Either type of connection means will allow the fabric bundles to drape over a moving animal without becoming detached. Also, the spacing of the bundles can be modified for particular applications.

Advantages of the invention include the following:

(1) The Automatic Pet Blanket operates by itself to cover a pet as it enters a kennel or stall without assistance from the animal owner or caretaker.

(2) The Automatic Pet Blanket adjusts to the movement of the animal in its kennel or stall, without uncovering the moving animal or restricting its movements.

(3) The Automatic Pet Blanket protects against light, wind, cold air, rain, and snow.

(4) Fabrics impregnated with antibacterial, antifungal, antiviral, anti-parasitic or insecticidal chemicals can be components of the cover; thus the Automatic Pet Blanket may protect or treat the animal against common diseases and pests such as fleas and ticks.

(5) The Automatic Pet Blanket permits ventilation within the kennel or stall while it provides protection from the elements.

(6) The blanket provides clearance from the floor of the kennel and, therefore, promotes sanitation within the animal enclosure.

(7) The thickness and texture of the hanging bundles of fabric may be adjusted for the season and weather in different climate conditions.

(8) The texture and weight of the hanging blanket may be adjusted for the animal coat and for a variety of domesticated four-legged animals.

Objectives of the invention include the following:

The primary objective is to create a blanket through which and under which a pet may move about and change its position without removing the cover. Similarly, the pet may enter or leave the kennel without displacing the blanket cover.

A closely related objective is to create an automatic self-covering pet blanket that provides warmth and protection for an animal in a kennel, dog house, or stall.

Another related objective is to overcome the disadvantage of existing blankets that lie on top or over the animal's body as it rests and may be disturbed or removed as the animal moves about.

Another related objective is to provide an automatic blanket that can be adapted to the size and structure of four-legged animals, especially dogs and horses with varying thicknesses of animal coats.

Another objective is to create sanitary conditions within the kennel, dog house, or stall by keeping the bottom of the blanket from reaching or touching the floor of the kennel or stall.

Another objective is to provide ventilation while at the same time provide protection from weather conditions such as cold, wind, rain, and snow.

Another objective is to create an Automatic Pet Blanket that is simple and economical to manufacture.

Another objective is to provide a support apparatus or platform for the blanket that is structurally uncomplicated and easy to install during manufacture or in an already existing kennel or animal stall by the animal owner or caretaker.

Another important objective is to create an Automatic Pet Blanket that is wear-resistant, easy to maintain, easy to remove (for cleaning), and replaceable with minimal effort.

BRIEF DESCRIPTION OF THE DRAWINGS

Similar reference characters denote corresponding features consistently throughout the attached drawings. The figures are not drawn to scale.

DETAILED DESCRIPTION

Figure 1:
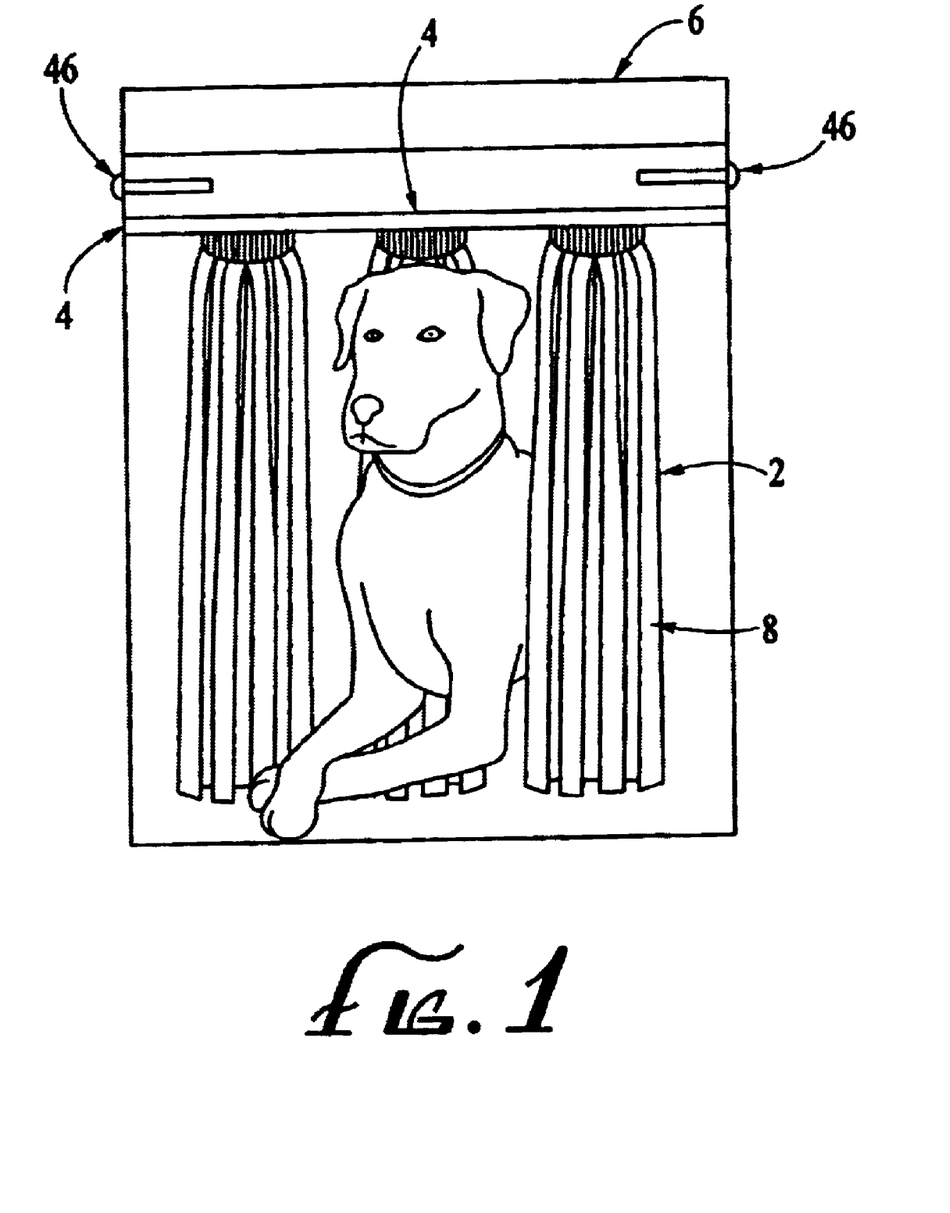
FIG. 1 shows a front plan view of a dog positioned inside the kennel which contains the platform and the Velcro connection means for the bundles of fabric.
Figure 2:
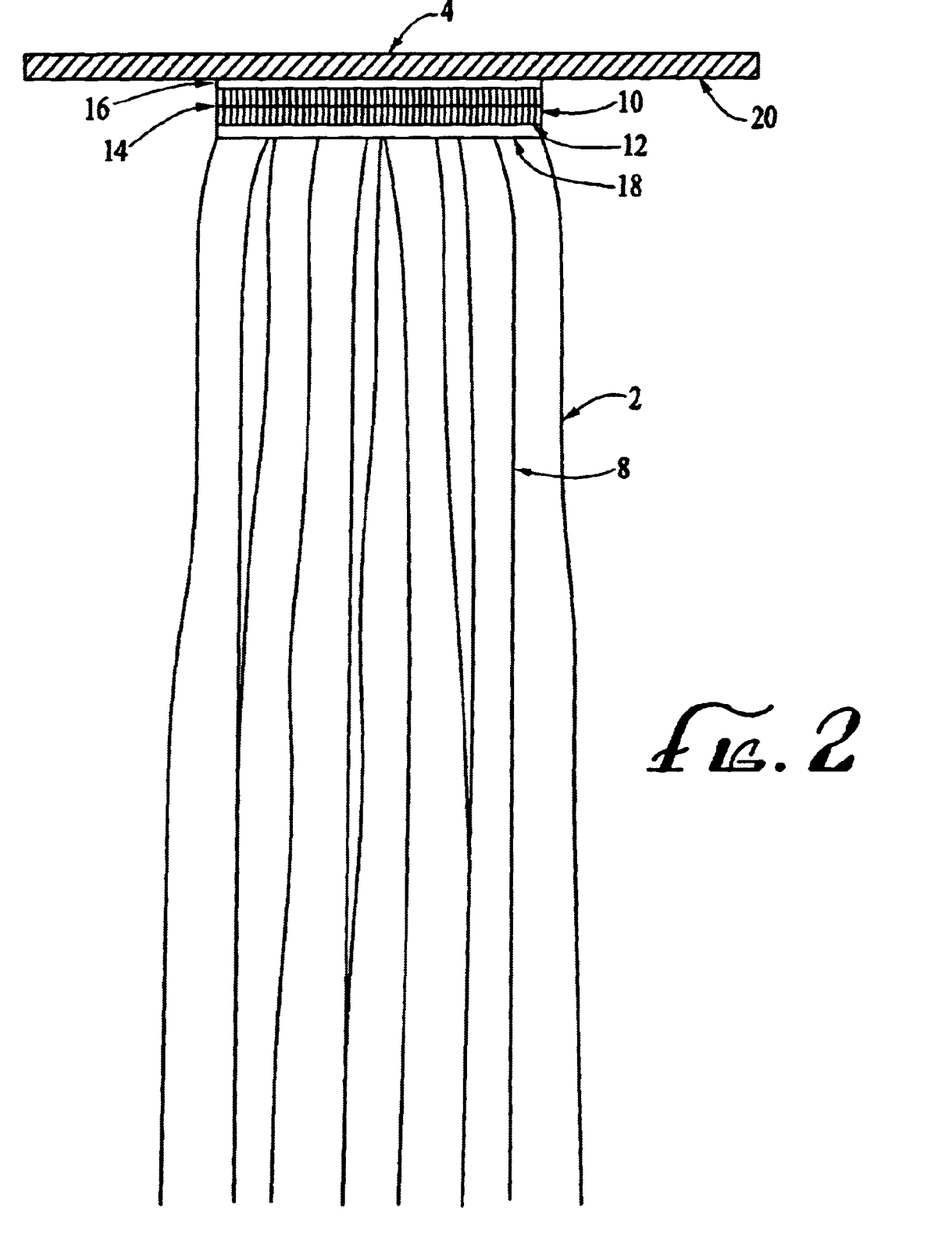
FIG. 2 shows a sectional view of a single bundle of fabric with the Velcro connection means.
Figure 3:
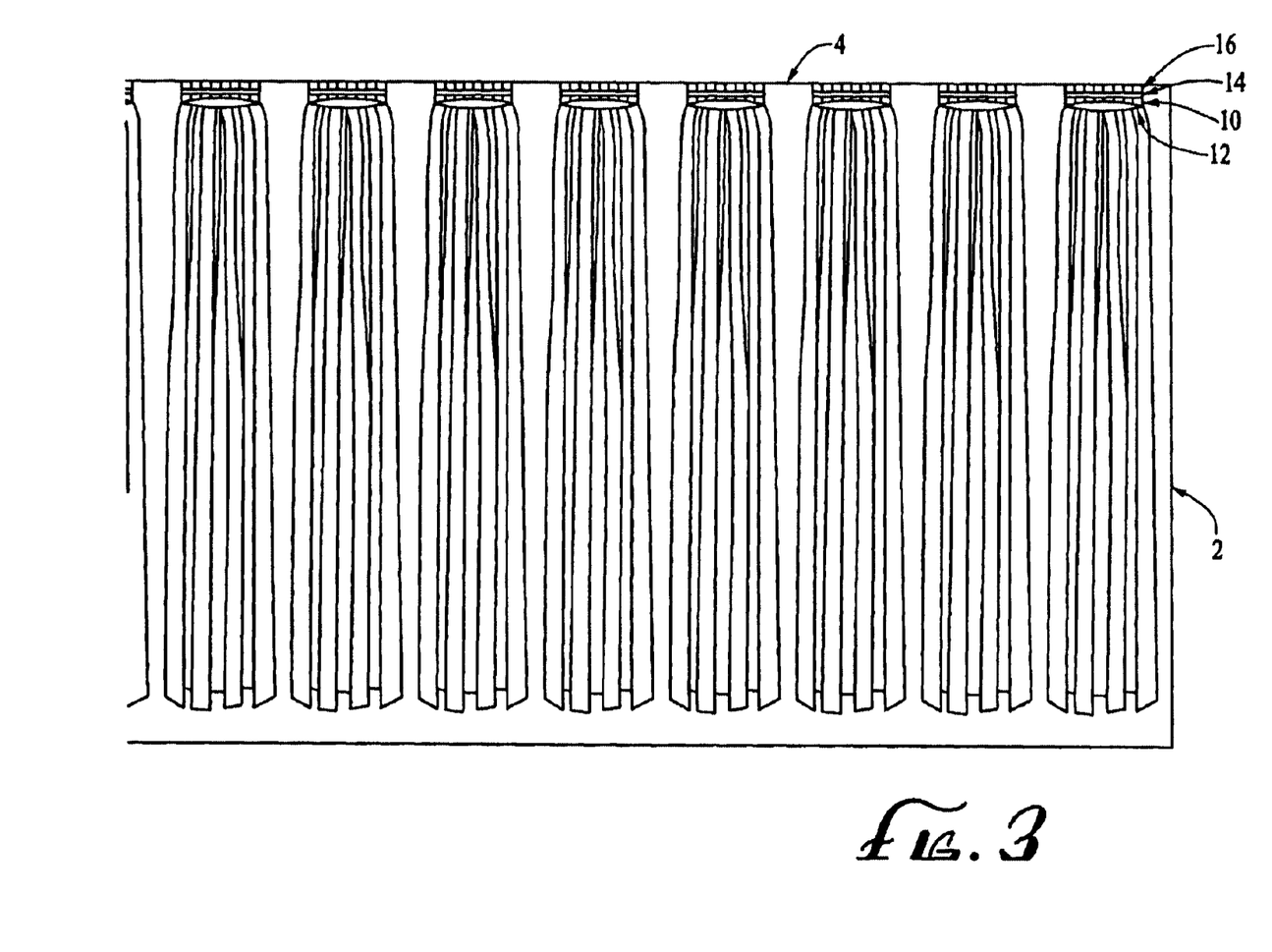
FIG. 3 shows a cross sectional view of the bundles of fabric attached directly to the ceiling of the kennel through the Velcro connection means.
Figure 4:
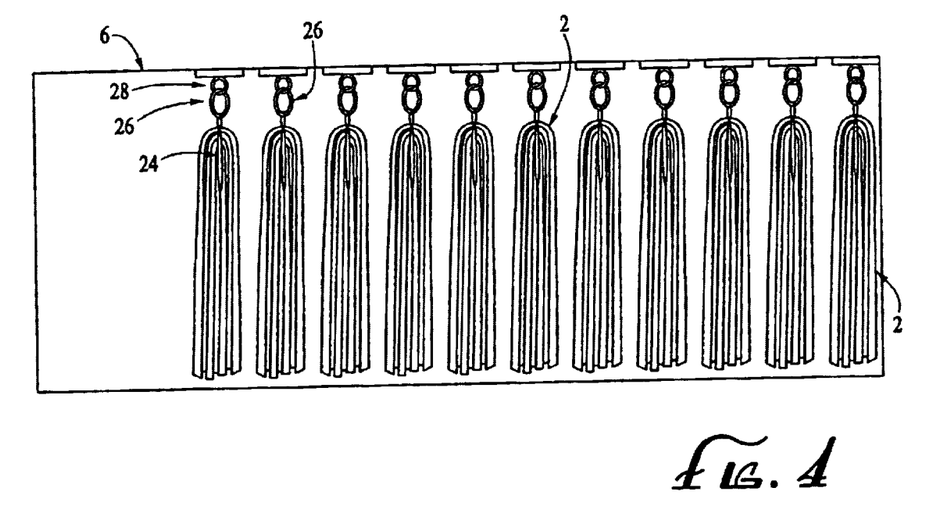
FIG. 4 shows a cross sectional view of the bundles of fabric attached directly to the ceiling of the kennel through the mechanical safety snap connection means.
Figure 5:
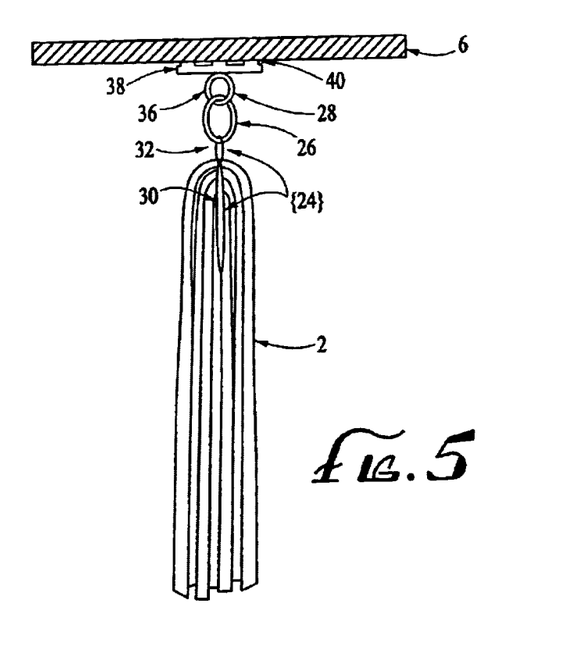
FIG. 5 shows a sectional view of a single bundle of fabric with the mechanical safety snap connection means.

FIGS. 1 through 8 show the bundles of fabric, the platform, and the means for attaching the bundles to the platform or directly to the kennel ceiling. Two different kinds of attachment means may be used: a Velcro connection means as shown in FIGS. 1, 2, and 3, and a mechanical safety snap connection means as shown in FIGS. 4 and 5. The bundles 2 may be attached to a platform 4 as shown in FIG. 1, or the bundles may be attached to the kennel ceiling 6 as shown in FIGS. 3 and 4. The attachment modes for the bundles are a Velcro connection means (shown in FIG. 2) and a mechanical safety snap connection means (shown in FIG. 5).

The fabric may be cotton, wool, synthetic, plastic, a woven blend, or other suitable material. The fabric may be shaped into strands 8, which are cut into flat strips or rounded or other shapes. The strands are gathered into bundles that are attached to the connectors in fixed linear or swirling sets of bundles. The bundles of fabric may be approximately 2 inches in diameter and 4 to 27 inches in length. The number, length, and diameter of the bundles vary depending on the size of the kennel and size of the dog.

The type of fabric and the thickness of the bundled fabric may be adapted to the weather. Because the fabric is attached by Velcro or removable connectors, the fabric may be changed according to season (for instance, wool in winter and cotton in spring or fall). The thickness of the blanket may be changed by adding connectors with attached fabric. Spacing the connectors and fabric in different ways can provide greater or lesser warmth and protection.

A distance of one to three inches between the bottom of the strands of fabric and the floor of the kennel keeps the cover sanitary. The fabric does not touch the floor of the kennel or animal enclosure as shown in FIG. 1. The exact distance from the floor may vary with the size of the animal. Sanitary conditions can be maintained since the fabric may be easily removed from the matrix or kennel ceiling. The fabric may be washed (laundered) or professionally cleaned, as appropriate. The fabric may be impregnated with non-toxic anti-bacterial chemical agents that inhibit or prevent growth or presence of bacteria, viruses, insects, parasites, flees, and funguses. The fabric may be designed to be partly or fully elastic, to allow for stretching by the animal and to prevent tearing.

In the preferred embodiment, the bundles of fabric are 4-ply cotton yarn, with the individual strands in a round cylindrical shape. FIG. 1 shows the strands hanging from the ceiling or platform and draping over the dog. The fabric allows easy movement of the dog inside the kennel while protecting the dog from the outside environment.

In the preferred embodiment, the connection means (shown in FIGS. 1, 2, and 3) comprises industrial strength Velcro. Commercially available Velcro with Sticky Back® may be used. The product Velcro has two opposing substrates. As shown in FIG. 2, the first opposing substrate comprises a front surface 10 with thousands of minute fiber hook-shaped structures in it, and a back surface 12 of Sticky Back. The Sticky Back contains a self-adhesive that adheres to many, if not most, cloth and metal composite structures. The second opposing substrate comprises a front surface 14 with thousands of minute fiber loop-shaped structures in it, and a back surface 16 of Sticky Back (which is the same type of material as on the back surface of the first opposing substrate). When the two opposing substrates come into physical contact, the hooks cling to the loops as the tiny hook-shaped fibers catch through the tiny loop-shaped fibers. Pressing the two Velcro substrates together makes the Velcro connection.

Peeling apart the two opposing substrates enables the hook-shaped fibers to be pulled from the loop-shaped fibers and breaks the Velcro connection. (In this way, bundles of fabric may be removed from the matrix or ceiling.)

In the preferred embodiment, the first opposing substrate is attached to the bundle of fabric on the back surface by applying the Sticky Back material to the bundle. The center area 18 of the bundle of fabric is the actual place where the back surface of Sticky Back (of the first opposing substrate) is attached. The front surface remains exposed and available for connection to a corresponding opposing Velcro substrate. The back surface of the second opposing substrate (which contains the self-adhesive Sticky Back) is applied to the under surface 20 of the platform or ceiling of the kennel. The Sticky Back provides the bonding mechanism for attachment to the platform or ceiling, the front surface of the second opposing substrate remains exposed.

Once the two front surfaces with the open exposed loop-shaped structures and hook-shaped structures come into physical contact, a connection is made. Through this Velcro connection means, the bundle of fabric hangs down from the ceiling or matrix of the kennel.

Figure 8:
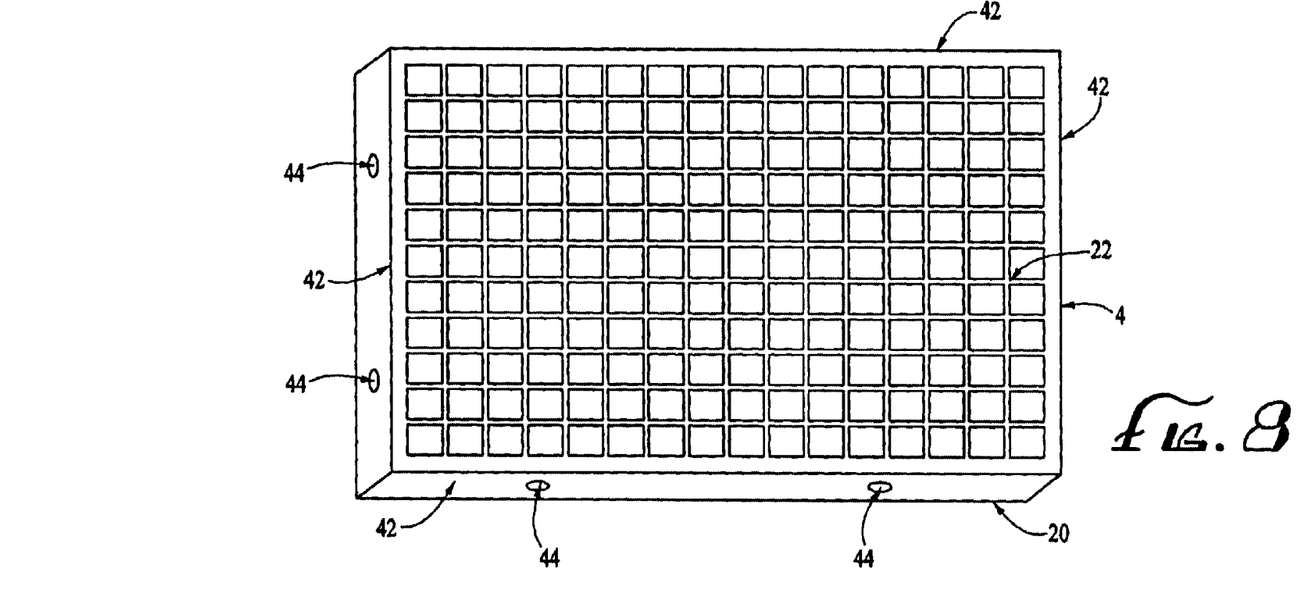
FIG. 8 shows a perspective view of the platform with its cross-links.

FIG. 8 shows the platform with the under surface and the cross-links 22 (that are the points of intersection of grid patterns). The back surface of one of the opposing substrates (with Sticky Back) is actually bonded to the under surface at the location of a specific cross-link. In the preferred embodiment, the first opposing surface comprises the hook-shaped structures and the second opposing surface comprises the loop-shaped structures. However, these two structures can be interchanged and the Velcro connection effect still obtained.

In a similar manner, the Velcro connection means may be used to attach bundles directly to the kennel ceiling (as in FIG. 3), thereby allowing the bundles of fabric to hang down from the ceiling.

Alternative to the Velcro connection means is a mechanical safety snap connection means as shown in FIGS. 4 and 5. As shown in FIG. 5, the mechanical safety snap connection means comprises a plastic receptacle 24, a safety hook 26, and a plastic retainer 28.

Figures 6, 7:
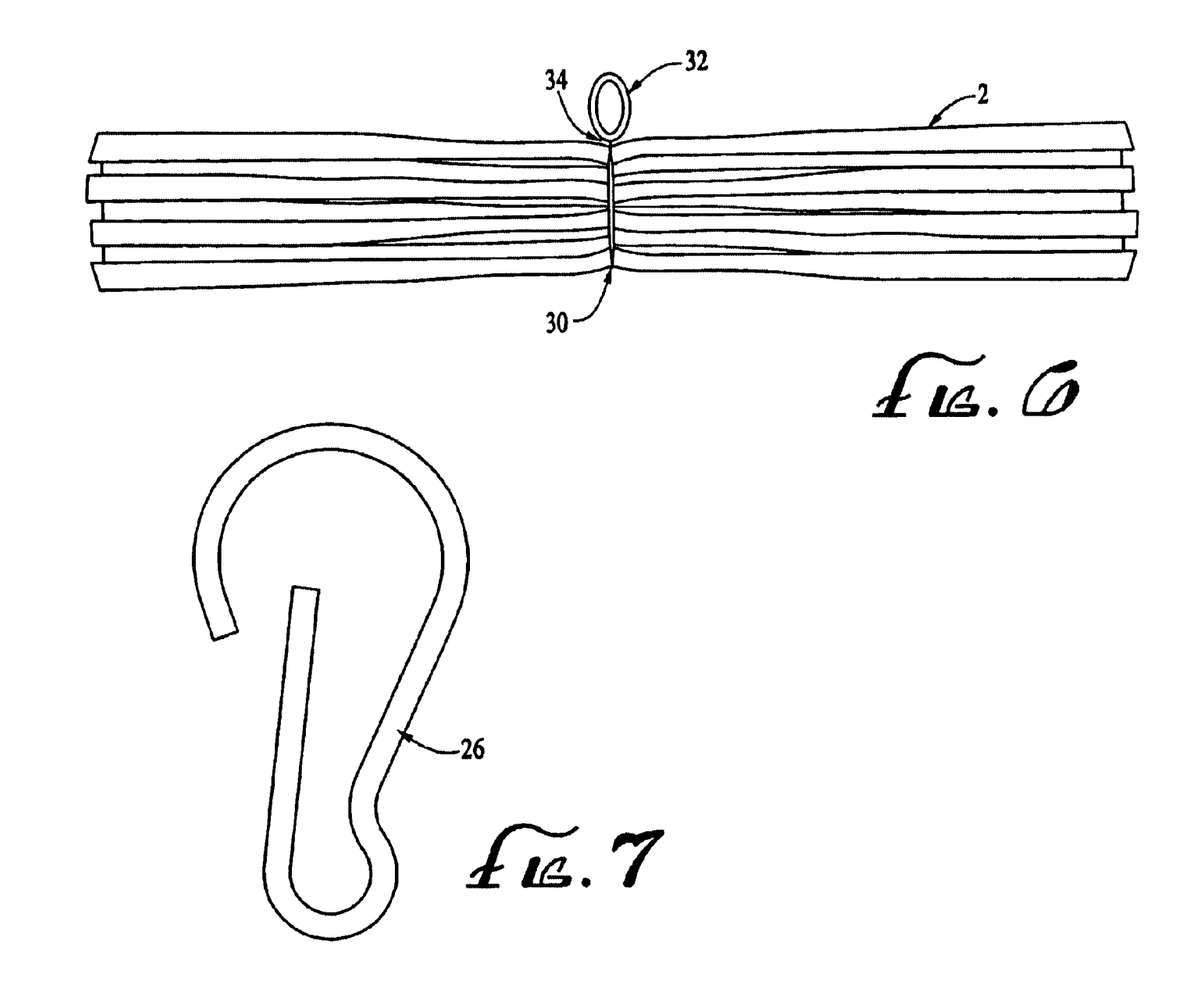
FIG. 6 shows a bundle of fabric positioned in relation to the plastic receptacle.
FIG. 7 shows an alternative plastic safety hook in the unlocked (open) position.

FIG. 6 shows the plastic receptacle which comprises a larger plastic loop 30 and a smaller plastic loop 32 that are bonded together. The larger plastic loop has a diameter of 2 inches and the smaller plastic loop has a diameter of ½ inch. Standard commercially available plastic loops may be used in creating the plastic receptacle. The two loops are bonded together with a suitable commercial industrial grade adhesive, and the bond exists over an area 34 that is approximately ⅛ square inch along one edge of both plastic loops. The bundles of fabric are placed inside the larger plastic loop (of the plastic receptacle) which in turn is wrapped tightly around the center of the bundles. A spray adhesive may be applied to both the plastic loop and the bundle of fabric to ensure that the bundle is bound together and bound to the safety hook. The spray adhesive may be a commercially available aerosol adhesive. Applying the spray adhesive prevents individual strands of the fabric from slipping or sliding in the safety hook.

After a bundle of fabric is positioned inside the larger plastic loop, the smaller plastic loop of the plastic receptacle is placed inside the safety hook, as shown in FIG. 5.

The safety hook has a key feature: the self-locking of the j-clamp structure. In the locked (closed) position there are no sharp exposed edges or openings through which the bundles of fabric can slip. The physical dimensions of the safety hook are approximately 1½ inches long and approximately 1 inch wide. In the preferred embodiments, the safety hook is an oval smooth structure, as shown in FIGS. 4 and 5. In an alternative embodiment (shown in FIG. 7), the safety hook can be an oblong/elliptical structure, or a modified "hourglass" type of structure. FIG. 7 shows the safety hook in the unlocked (open) position.

Preferably, the safety hook is composed of a plastic material. In alternative embodiments, the safety hook can be composed of metal or a composite material.

The plastic retainer comprises a closed plastic loop 36 and a plastic rectangular backing 38 that is attached to the loop by a suitable mechanical or adhesive method. The loop may be approximately 2 inches in diameter and the backing may be approximately 1 to 2 inches in length or width. Generally, the loop and backing are sized and shaped appropriately to match the size and shape of the safety hook that is chosen for a particular application. On the ceiling of the kennel or on the under surface of the platform, the plastic retainer is attached by using double mounting tape across the flat surface 40 of the backing.

The safety hook (which already contains the smaller plastic loop of the plastic receptacle) is connected to a corresponding plastic retainer. Specifically, the safety hook is opened over the plastic retainer's loop and then closed so that the safety hook is self-locked and the bundles of fabric hang down.

As stated above, a platform (as shown in FIG. 8) may or may not be used as part of this invention. In the preferred embodiment which comprises a platform, the platform is made of a hard plastic board. The dimensions of the platform are 36 inches long, 26 inches wide, and approximately ½ inches in thickness (which correspond to the dimensions of a medium-sized dog house). The platform has four sides 42, with holes 44 on each of the four sides. The holes are available for screwing the platform to the walls of the kennel. Preferably, there are two holes on each side of the platform and each of the holes is about ¼ inch in diameter and 1 inch in depth. The cross-links are 2 to 4 inches in width to match the size of the backing of the plastic receptacle. The length of the cross-links matches the length of the platform or correspondingly the width of the platform.

The platform is suspended below the roof of the kennel and attached to the sidewalls of the kennel. Screws 46 (shown in FIG. 1) are placed in the holes and attached to screw/bolt combinations on the sidewalls of the kennel. In the preferred embodiment, 8 screws are used; that is, there are two screws and consequently two attachments on each of the four sides of the platform. The screws fit into corresponding wall holes that physically align with the platform holes. In this manner, the screws are used to attach the platform to the kennel sidewalls. (In alternative embodiments, one screw per side may be used.)

Once screws are placed in position and physically link the platform to the sidewalls, a suitable adhesive may be applied to the area surrounding the screws and the hole openings. Several suitable commercial adhesives are available to provide a "gap filler" or "liquid nut/bolt locker" or "threadlocker." Any one of these products can be used to ensure a permanent attachment at the location of the screws (which are inside the holes and physically link the platform to the sidewalls).

Specific locations on the platform or kennel ceiling are selected for hanging the bundles of fabric, depending on the particular animal and application.

Extra Embodiments

In the preferred embodiments, the dimensions for the platform, attachment means, and bundles of fabric are based upon a typical medium-sized commercial dog kennel. For larger kennels, the dimensions of the individual components may be increased. Likewise, for smaller kennels, the dimensions of the individual components may be correspondingly decreased. At least one bundle of fabric is required; in the preferred embodiments, there are a plurality of bundles.

Figure 9:
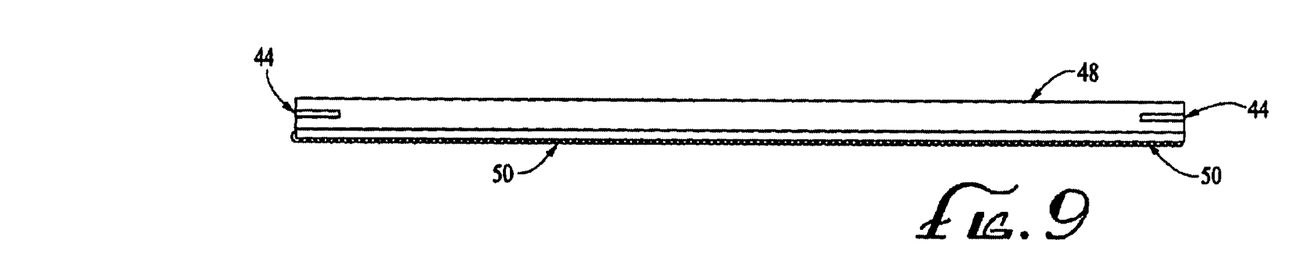
FIG. 9 shows a cross sectional view of a flat board (an alternative embodiment of the platform) with a Velcro layer attached to the under surface of the board.

In FIG. 9, the platform comprises a flat solid board, which is an alternative to the preferred embodiment discussed above. (There are no cross-links or open spaces in the board.) The board has an under surface 48 to which a Velcro layer 50 may be attached. This Velcro layer essentially corresponds to the second opposing surface that is discussed in terms of the preferred embodiments. The Velcro layer can lie across the entire length of the board or lie in sections along the board, as specified above in the preferred embodiments containing the Velcro connection means (for the applications involving either the platform or ceiling). The dimensions of the board may correspond to the dimensions listed above for the preferred embodiments, that is, 36 inches long, 26 inches wide and ½ inches in thickness.

If the board does not contain the Velcro layer, the mechanical snap connection means may be used to attach bundles of fabric to the under surface of the board.

Another alternative embodiment includes attaching at least one bundle and preferably a plurality of bundles of fabric along a bar. Then, the bar is attached to a platform or ceiling through a mechanical safety snap connection means (as disclosed in the preferred embodiments).

A third alternative embodiment includes using a conventional motorized means for hoisting or elevating a platform which supports bundles of fabric. A typical rotor motor or conventional pulley/lever technique may be used to position a platform in an area where an animal is housed.

The Automatic Pet Blanket may be built into new kennels as they are manufactured. Platforms of different sizes and shapes can be made to fit into already existing kennels. They can be attached to the ceiling, or they can be supported by columns or legs that are positioned near the corners of the kennel. They can be constructed inside the kennel permanently or attached by removable brackets. They can be taken apart or dismantled and moved to another kennel, or they can provide free-standing protection for an animal. Also, the kennel ceiling surface can have a variety of shapes, not only flat and rectangular.

Applications of the Automatic Pet Blanket can be made for barnyard animals or livestock or other animals that need protection from the elements.

Horses, for example, need protection from the elements, and an automatic blanket cover can be designed for horses. Typically, a horse wants its head and hind quarters uncovered and free of encumbrances. A horse would balk at walking into or through strands of overhanging fabric. Consequently, an automatic blanket cover designed for a horse, using the principles of construction for the Automatic Pet Blanket, would be moved onto the animal rather than having the animal walk head first through hanging strands of fabric.

In a stall or stable or in a horse trailer, a movable automatic cover, powered by an engine or by hand, can be lowered on both sides of the animal and then drawn together from the two sides to cover the body of the animal, leaving the head and hind quarters uncovered.

An automatic blanket cover for a horse of other large animal can be designed in either of two ways:
(A) By attaching bundles or strands of fabric to individual rods connected to an engine; as the engine powers the rods, the strands of fabric are lowered downward to cover the animal or pulled upward to remove the cover.
(B) By raising or lowering the entire platform (with fabric bundles or strands attached) by means of an engine, and then adjusting the fabric to cover or uncover the animal in a separate procedure.

Both the Automatic Pet Blanket and the automatic blanket adaptation for large animals have potential uses by individual animal owners, in animal hospitals, on farms or ranches, in a zoo, and by entertainers with animal performers.

Commercially available products may be used in the process of making the Automatic Pet Blanket. The invention is not limited to any specific commercially available products. In all cases, generic products or other commercially available products may be substituted.

In its commercial embodiments, the present invention will be made available in a variety of sizes, shapes, and materials to accommodate different applications. The scope of the invention is not limited to any of the physical dimensions specified in the preferred embodiments. Also, the present invention is not limited to the embodiments described above, but encompasses any and all embodiments within the scope of the claims.

What is claimed is:

1. A hanging animal cover, the cover comprising:
   (a) at least one bundle of fabric;
   (b) a platform of material, the platform comprising an under surface; and
   (c) means for attaching the bundle to the under surface of the platform whereby the animal is covered by the bundle of fabric, wherein the attachment means comprises means for connecting a mechanical safety snap.

2. A hanging animal cover, the cover comprising:
   (a) at least one bundle of fabric;
   (b) a platform of material, the platform comprising an under surface, wherein the platform further comprises cross-links; and
   (c) means for attaching the bundle to the under surface of the platform whereby the animal is covered by the bundle of fabric.

3. A hanging animal cover, the cover comprising:
   (a) at least one bundle of fabric;
   (b) a ceiling on an enclosure; and
   (c) means for attaching the bundle to the ceiling whereby the animal is covered by the bundle of fabric, wherein the attachment means comprises means for connecting a mechanical safety snap.

4. An apparatus for covering an animal, the apparatus comprising at least one bundle of fabric, a platform of material, the platform comprising an under surface, and means for attaching the bundle to the under surface of the platform, wherein the attachment means comprises means for connecting a mechanical safety snap, wherein the animal is free to move about, and wherein the animal is covered by the bundle of fabric.

5. An apparatus for covering an animal freely moving about, the apparatus comprising at least one bundle of fabric, a ceiling on an enclosure, and means for attaching the bundle to the ceiling, wherein the attachment means comprises means for connecting a mechanical safety snap, wherein the animal is covered by the bundle of fabric.

* * * * *